2,791,506
PIE CRUST MIX

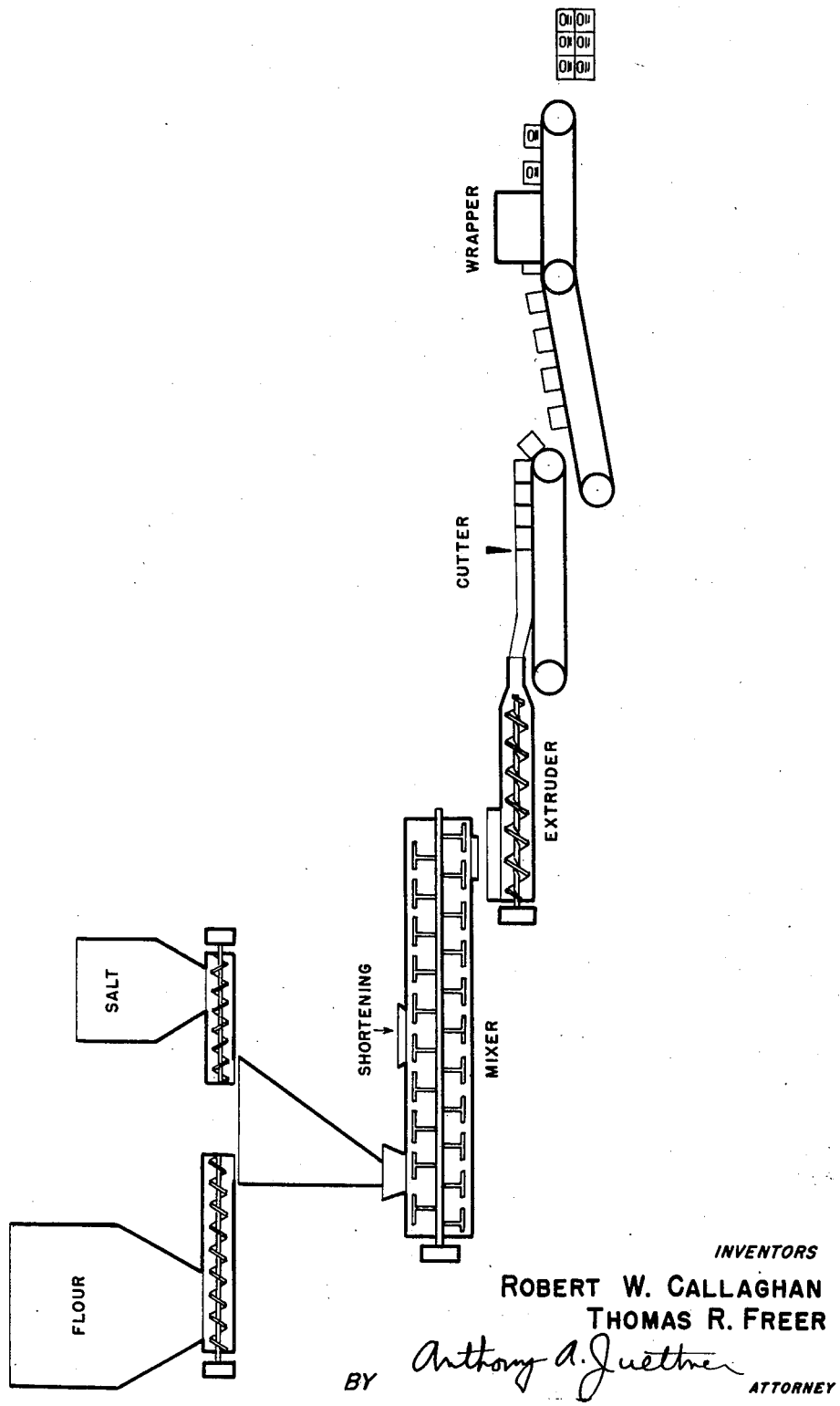

Robert W. Callaghan and Thomas R. Freer, Minneapolis, Minn., assignors to General Mills, Inc., a corporation of Delaware Application February 9, 1953, Serial No. 335,682

8 Claims. (Cl. 99—94)

The present invention relates to a pie crust mix containing the normal ingredients employed in the production of pie crust, and requiring only the addition of water for the production of the pie crust.

Pie crust mixes heretofore have been composed principally of flour and shortening and may contain minor quantities of other ingredients such as salt. They have generally been in a free-flowing condition. The ingredients have been mixed and blended until the shortening is distributed through the flour to some extent and until the product is still a free-flowing product which may be packaged in ordinary packaging equipment. This has placed definite limitations on the product which is produced. Thus, in order to provide a free-flowing product, the amount of mixing which is permissible is limited. The mixing cannot be continued until the shortening is thoroughly smeared or greased onto the flour, as the product then loses its free-flowing characteristic. Furthermore, since the shortening must be fairly uniformly distributed through the mix, it follows that with limited mixing, the amount of shortening that can be relatively uniformly dispersed in such a mix is fairly small. When it is attempted to produce a pie crust mix having a high shortening concentration, the amount of mixing necessary to disperse this through the mix results in excessive greasing of the flour so that the product is no longer free-flowing and is considered unsuited for commercial operations.

There is a further disadvantage to these free-flowing pie crust mixes. In preparing a pie crust from such a mix, the housewife adds water to the mix and stirs the mixture until a dough is formed which may then be rolled out and baked. The flour absorbs the water, thus causing the particles to cohere to form a dough. As this gluten absorbs water, it takes on its typical tough elastic characteristic, which tends to make the dough, and consequently the pie crust, tough. When, however, the flour is thoroughly greased, its ability to absorb water is reduced and consequently less water may be used to make the dough and the dough thus produced is more tender. Furthermore, shortening thoroughly greased on the flour is used with much greater efficiency in its role as tenderizing agent.

It has now been discovered that these difficulties and shortcomings of the prior art mixes may be overcome by doing the very thing the prior art sought to avoid, namely by thoroughly greasing the shortening onto the flour and actually mixing the components until a solid block of mix is obtained. This eliminates the necessity for close control over the time of mixing and likewise eliminates the necessity for maintaining a low level of shortening in the mix. Furthermore, since the shortening is thoroughly mixed on the product, the amount of water which is necessary to prepare a dough from this mix is reduced. Consequently, the amount of water which is absorbed by the flour and which is converted into an elastic mass by means of the gluten is reduced. In addition, it is found that the dough prepared from such a mix is much more tolerant to working. Such a dough can be worked very extensively without the product developing toughness.

In contrast, a dough prepared from a free-flowing pie crust mix described above, becomes tough, the toughness increasing with the amount of working of the dough.

It is, therefore, an object of the present invention to provide a novel pie crust mix in the form of a solid block of pie crust mix in which the shortening is thoroughly greased onto the flour, so that the product no longer possesses free-flowing characteristics.

It is a further object of the present invention to provide a novel process of producing such a product.

The essential components of the present pie crust mix are flour and shortening. Usually a small percentage of salt is also included. The present product may contain a relatively low shortening content, such as 25%, and actually at this level a much more tender and flaky crust can be obtained than is possible at this level by prior art methods. However, since the method is adapted to the use of a much higher shortening content than has been feasible heretofore, it is preferred to use a higher shortening level than 25%. It is thus possible to go up to a shortening content as high as 42%. The shortenings which are employed may be the typical shortenings employed for this purpose heretofore. They may be composed of animal or vegetable fats such as lard and the hydrogenated vegetable oils. A portion of the shortening may be in the form of shortening flakes as described in the copending application of Callaghan and Dorger entitled Pie Crust Mix, Serial No. 281,916, filed April 11, 1952. Usually from 3–15% of these shortening flakes, based on the weight of the mix, may be used. In preparing the mix, it is desirable to preblend the flour and the salt to insure homogeneity. Thereafter the shortening and the shortening flakes, if they are employed, are added and the entire mass mixed until a solid or completely balled form of product is obtained. This product is then extruded through a nozzle and a suitable length of the extrusion may be cut off and packaged much in the manner that other semi-solid products such as butter are packaged.

In the process of mixing the shortening with the flour, the mixing may be accomplished in conventional mixing equipment and the solidified or balled product obtained therein. However, it is unnecessary to carry on the mixing to such an extent in this type of equipment. It is preferred to carry on part of the mixing under these circumstances, and to complete the mixing in the extrusion equipment. In this extrusion equipment considerably greater pressures are exerted on the product, and tend to make it coalesce. Furthermore, such extrusion equipment frequently has multiple augers which serve to effect further mixing.

The product which is obtained is a cohesive, substantially homogeneous mass. It is not merely a block formed by pressure, but actually the block appears somewhat like a dough in that it will not crumble into a free-flowing product. If an ordinary pie crust mix as is commercially available is compressed, it will form a block, but upon breaking the block crumbles into a powdered or granular form. This is not true of the present product.

In the drawing there is diagrammatically illustrated the general flow of materials in the production of a produt of the present type. Flour and salt may be fed at a controlled rate from the hoppers indicated and the salt and flour thus fed drop into a hopper feeding into the mixer. The salt and flour enter the end of the mixer and are preliminarily blended as they progress along the blender to the point at which the shortening is added. The shortening may be added in any convenient form. It may be added in the form of large blocks, or lumps. It may be extruded into the mixer or may be added in a liquified form. The shortening is then blended with the flour and salt mixture as the mixture advances further toward the discharge end of the mixture.

The amount of mixing which takes place in this mixer may be varied widely. It is not essential, as was pointed out previously, that the shortening be thoroughly greased onto the flour in this mixing step. This thorough greasing and mixing may actually occur in the extruding machine. Obviously, the shortening should be mixed in with the flour and salt sufficiently so that the mixing and the pressing which takes place in the extruder will be sufficient to produce the finished block of product. It is, of course, possible to carry on the mixing in the mixer to the extent that the product discharged therefrom is in the form of lumps or blocks, in which case the extruder performs essentially only the function of forming the material into the desired shape for cutting and packaging. The type of mixer which is employed is not critical. The mixer shown is a paddle type mixer, but other conventional mixers used for this purpose, such as ribbon mixers and the like, may be used.

The extruder illustrated is shown containing a screw conveyor. Frequently these extruders may contain a plurality of such conveyors working together to force the material along the extruder and out of the extruder nozzle. Any conventional equipment employed for this purpose may be used. Typical of these pieces of equipment are the extruders used in the production of commercial butter prints.

In the event that the material discharged from the mixer is completely greased, it is possible to use an ordinary piston type of extruder in place of the auger type illustrated here. In this event the sole purpose of the extruder is to shape the product, and prepare it for packaging, and no further mixing is necessary in the extruder itself.

As the extruder material leaves the extruder nozzle, it may be carried along in this belt conveyor and may be cut into blocks of the desired shape and weight. These blocks are then passed through a typical wrapping machine to apply the usual wrappings or cartons. The finished product is then discharged from the wrapper and is ready for shipment. It is apparent that the apparatus which has been illustrated is merely typical of numerous aids and apparatus which may be used for this purpose. Other pieces of equipment which perform the same function may be substituted for the pieces of equipment illustrated.

*Examples*

A series of pie crust mixes were prepared having the compositions indicated in the table below. The flour and the salt were mixed first, and then the shortening extruded into the mixture of flour and salt. The shortening was then thoroughly distributed on the mixture by working the product. The shortening flakes, where they were employed, were added either after the main portion of the shortening had been thoroughly distributed or may have been mixed in at the same time that the shortening was introduced into the mixture. After the shortening was thoroughly greased onto the flour (1–2 minutes at very high shortening concentrations and up to 25 minutes at the very low shortening concentrations), the mix was introduced into an extruder in which the material was forced out of a rectangular nozzle having dimensions of approximately 2" x 2". The extruded material was cut off in lengths of approximately 3 inches, each block containing approximately 9 ounces.

Each of the blocks of product was made into a pie crust by mixing 30 cc. of water with the block, forming it into a dough by mixing the water in until the product became "dry" and was no longer sticky. Half the dough was then rolled out into the form of a pie crust, and the crust was baked.

For control purposes, a free-flowing mix was prepared from flour, salt and shortening in which the shortening comprised 32% of the same shortening, but no flakes. In preparing a dough from this mix 60 cc. of water were employed per 9 ounces of the mix since this is the quantity of water required for the production of a workable dough from such a mix and is the quantity of water conventionally recommended for that purpose. The following table shows the composition of the products tested and also the properties of the dough and of the crust baked from the dough. These data show that even at the very low shortening levels of 25%, an acceptable crust is produced, while at the higher shortening levels a far superior crust is produced. The control containing 32% shortening shows characteristics which are quite comparable to those of the mix containing 25% shortening as made according to the present invention. This demonstrates the much more efficient utilization of the shortening in the present product.

| Product No. | Composition | Dough Mixing Character | Dough Handling or Rolling Character | Tenderness |
|---|---|---|---|---|
| Control | 32% shortening | sl. firm—good | sl. firm | 10 |
| 1 | 25% shortening | dry—stiff | v. firm | 10 |
| 2 | 25% shortening, 5% flakes | ----do---- | ----do---- | 11 |
| 3 | 28% shortening | v. sl. stiff | v. sl. firm | 10+ |
| 4 | 28% shortening, 5% flakes | ----do---- | ----do---- | 12 |
| 5 | 32% shortening | good | pliable—good | 13 |
| 6 | 32% shortening, 5% flakes | v. good | v. pliable—good | 14 |
| 7 | 34% shortening, 5% flakes | ----do---- | ----do---- | 15 |
| 8 | 37% shortening | ----do---- | short—v. v. pliable | 16 |
| 9 | 37% shortening, 5% flakes | ----do---- | ----do---- | 17 |

The advantages of the present invention may, therefore, be summed up as follows.

(1) The process simplifies plant mixing procedures as it eliminates the judgment as to the degree of mixing.

(2) Greater efficiency of shortening is obtained. Thus, the table shows that by the present process 25% of shortening accomplishes the same tenderness of crust that is obtained with 32% with the conventional method of mixing.

(3) The intimate mixing of the shortening with the flour makes possible a substantial reduction in the amount of water that is used in preparing the pie crust dough. Two tablespoons of water (30 cc.) is optimum with the mixes of the present invention, whereas 60 cc. (4 tablespoons of water) are required for present-day commercial mixes weighing 9 ounces. With present-day mixes two tablespoons of water are entirely insufficient since the dough is too dry to hold together and it cannot be rolled out. This reduced amount of water which may be employed with the present product increases the tenderness in that it does not permit the gluten in the flour to be developed to the elastic mass that develops with present pie crust mixes. The importance of the reduced amount of water is demonstrated by the fact that products 1–9 were also baked into a crust by employing 45 cc. of water as compared with the 30 cc. water. In each instance it was found that the tenderness went down from 1–3 points as a result of this increase in the amount of water used.

(4) The product obtained according to the present invention and containing 32% fat plus 5% flakes appears to be comparable in tenderness to the best homemade crusts as prepared by some of the most popular published recipes, some of which include even a greater percentage of shortening.

(5) The present pie crust mix makes for a greatly improved dough rolling quality. The dough is much more soft and more pliable. Furthermore, it tolerates much more mixing and working than is possible with the dough prepared from a conventional pie crust mix.

We claim as our invention:

1. Process of making a dry pie crust mix which comprises preparing a blend of shortening and flour containing at least 25% shortening, working the blend until the shortening is thoroughly distributed on the flour and until the blend is converted into a cohesive substantially homogeneous dough-like mass in the form of a solid block.

2. Process of preparing a dry pie crust mix which comprises preparing a blend of shortening and flour containing from 25-42% shortening, thoroughly working said blend until the shortening is thoroughly distributed on the flour and until a cohesive substantially homogeneous dough-like mass is formed and forming the mass into a solid block.

3. Process of preparing a dry pie crust mix which comprises preparing a blend of shortening and flour containing from 25-42% shortening, thoroughly working said blend until the shortening is thoroughly distributed on the flour and until a cohesive substantially homogeneous dough-like mass is formed, and extruding the mass thus obtained into shaped blocks.

4. Process of preparing a dry pie crust mix which comprises preparing a preliminary blend of shortening and flour containing from 25-42% shortening, mixing said blend to partially distribute the shortening on the flour, then subjecting the mixture thus obtained to working under high working pressures to thoroughly grease the shortening onto the flour and to form a cohesive substantially homogeneous dough-like mass, and extruding the mass thus obtained into shaped blocks.

5. Process according to claim 4 in which shortening flakes are introduced into a matrix of the dough-like mass but the shortening flakes are not greased onto the flour.

6. A dry pie crust mix containing at least 25% shortening, said mix containing the shortening thoroughly greased onto the flour to the extent that a cohesive substantially homogeneous dough-like mass is obtained in the form of a solid block.

7. A dry pie crust mix containing from 25-42% shortening, the shortening being thoroughly greased onto the flour until the product is a cohesive substantially homogeneous dough-like mass, the product being in the form of shaped blocks.

8. A dry pie crust mix containing from 25-42% shortening, a portion of the shortening being in the form of shortening flakes, the nonflake shortening being thoroughly greased onto the flour to the extent that a cohesive substantially homogeneous dough-like mass is obtained as a matrix in which the shortening flakes are dispersed as discrete particles, the product being in the form of shaped blocks.

References Cited in the file of this patent

UNITED STATES PATENTS

| | | |
|---|---|---|
| 1,218,116 | Post | Mar. 6, 1917 |
| 1,326,276 | Kohman | Dec. 30, 1919 |
| 1,790,347 | Hawkins | Jan. 27, 1931 |
| 2,253,770 | Duffy | Aug. 26, 1941 |
| 2,522,591 | Wilson | Sept. 19, 1950 |
| 2,686,721 | Callaghan et al. | Aug. 17, 1954 |
| 2,731,350 | Busch | Jan. 17, 1956 |

OTHER REFERENCES

Lowe: Experimental Cookery, 2nd ed. 1937, John Wiley & Sons Inc., pp. 568-572.